Nov. 26, 1929.   S. BIRNIE   1,737,071
PROCESS AND APPARATUS FOR STRIPPING THE KERNELS
OF COFFEE BERRIES AND OTHER SIMILAR FRUITS
Filed Feb. 4, 1928
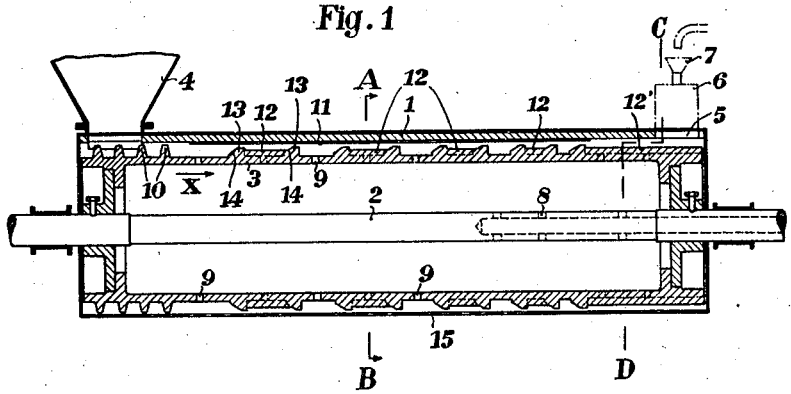
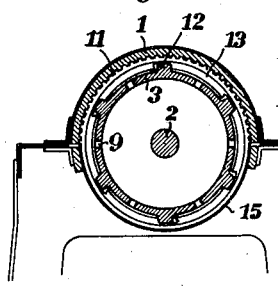
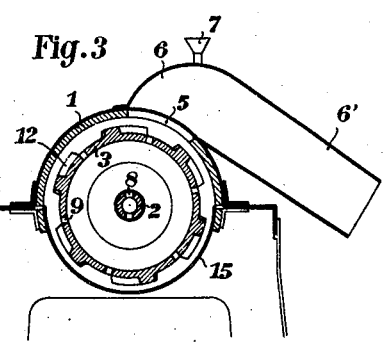
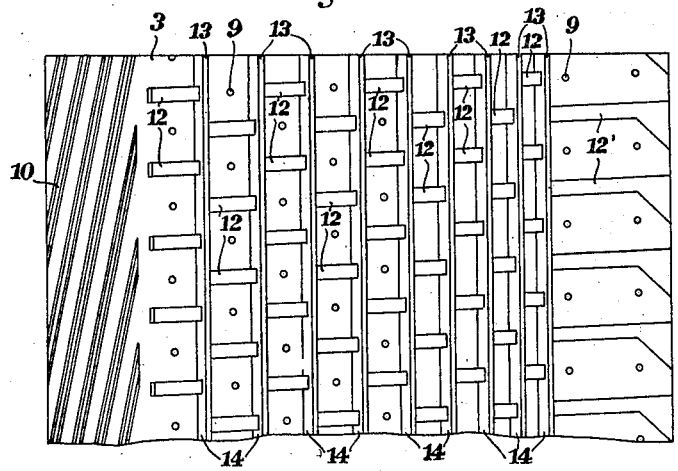

Patented Nov. 26, 1929

1,737,071

UNITED STATES PATENT OFFICE

STEVEN BIRNIE, OF DJEMBER, JAVA, DUTCH EAST INDIES, ASSIGNOR TO FRIED. KRUPP GRUSONWERK A. G., OF MAGDEBURG, BUCKAU, GERMANY, A CORPORATION OF GERMANY

PROCESS AND APPARATUS FOR STRIPPING THE KERNELS OF COFFEE BERRIES AND OTHER SIMILAR FRUITS

Application filed February 4, 1928, Serial No. 251,975, and in the Netherlands March 18, 1927.

The subject matter of this invention comprises a process and an apparatus particularly intended for the removal of the flesh of coffee berries in order to strip or separate therefrom the coffee beans which they contain, but also suitable for use in decorticating other similar fruits to obtain the kernels thereof.

The coffee beans are contained in a parchment-like envelope in which they lie with their flat sides facing each other. This envelope is surrounded by a mucous integument which in its turn is enclosed in the pulp or fleshy part of the fruit. In order to obtain the coffee beans, the flesh or pulp and the mucous integument have first to be removed, and then the kernels washed. These operations have hitherto been performed in three stages, the pulp being first removed by means of a mill, whilst the mucous integument was left on the kernel, then in order to remove the said integument, the kernels were submitted to a further treatment in containers in which they were left for two to three days, the mucous integument being loosened by fermentation, and the kernels were thereupon introduced into a washing device in which the loosened but still adhering mucous remainders were rinsed off. Only then could the kernels be dried and the parchment-like envelope removed. This process is not only complicated but expensive to perform, for it requires more than one apparatus, and several days have to elapse before the freshly gathered fruits are ready for drying. The principal object of this invention is to simplify the process in question.

According to this invention the berries without previous treatment are in a purely mechanical manner in a single operation stripped of their pulp, freed from mucilage and the kernels washed, so that the kernels are obtained ready for drying. Considerable savings in space, first cost, working cost, and time are thus effected. Another advantage is that clean kernels are obtained from berries which are not quite ripe and which have been attacked by the insect known as "boeboeck".

In carrying out the process, the berries may be conveyed for example in a continuous manner through a chamber of annular cross section, in such manner that they roll through the said chamber in a spiral path and rub against each other and against the walls of the chamber; the rolling layer is preferably submitted at the same time to pressure and to washing. The pressure can be obtained in various ways, for instance by arranging the discharge opening of the kernels in the upper part of the chamber, so that the kernels must escape by overflowing upwards, a damming action on the moving mass of material being thus obtained by opposing the action of gravity to its progress and changing the general direction of its movement. Devices may also be provided for damming the mass during the rolling movement, thus for instance a continuously or intermittently progressive reduction or narrowing of the rolling space or a repeated temporary reduction thereof produces a constant or intermittent increase of pressure in the rolling layer. The chamber or annular space in which the material rolls along may lie between a fixed outer cylinder and an inner cylinder rotatably mounted therein. Both cylinders are provided at the surfaces facing each other, with roughened portions, projections, ribs or the like. The ribs, more particularly on the rotating inner cylinder, could be arranged obliquely of the longitudinal axis of the cylinder, so that they would at the same time assist in conveying the material.

It is a further substantial advantage of the invention that the flesh or pulp of the berry and the mucilage can be jointly discharged for further utilization. The residue, that is to say the mixture of pulp and mucilage, can be agglomerated or briquetted and the briquettes thus obtained used as fuel. It is very advantageous that the mucilage should be thus mixed with the pulp, as it forms a binder for the manufacture of the briquettes, and therefore the addition of separate binding agents will not as a rule be required.

The construction of a machine suitable for carrying the process into practical effect is illustrated by way of example in the accompanying drawings, in which:—

Figure 1 represents the machine in vertical longitudinal section.

Figure 2 is a vertical section on line A—B in Figure 1.

Figure 3 is a cross section on line C—D in Figure 1.

Figure 4 represents a development of a part of the surface of the inner cylinder.

Through a cylindrical casing 1 passes a spindle 2 on which is mounted an inner cylinder 3. The dimensions of the two cylinders are so calculated that a small clearance is left between them, and a space of annular cross section is thereby provided through which the berries are caused to roll. The berries are fed in at one end through a hopper 4, and the kernels after stripping escape by overflowing outwards and upwards through an opening 5 provided in the upper portion of the casing, being then discharged through a pipe 6. A funnel 7 may be combined with a downwardly inclined portion 6' of the pipe 6 in order to enable rinsing water to be supplied for the additional rinsing of the kernels. The supply of the washing water to the interior of the machine may be effected through the hollow spindle 2 from which it is conveyed through openings 8 into the inner cylinder 3, and from the latter through openings 9 into the annular chamber.

The material coming from the hopper 4 is first advanced in the direction of the arrow X by a feeding worm or helical conveyor 10. The outer cylinder 1 is provided with continuous longitudinal ribs 11, and the inner cylinder with intermittent ribs 12 which are arranged each between two rings 13. These rings which obstruct and retard or dam the passage of the material may be termed damming rings. The ribs 12 preferably extend somewhat obliquely of the cylinder axis, so that they can exercise at the same time a conveying action on the material in the direction of the arrow X. The rings 13 project beyond the ribs 12, that is to say they temporarily narrow the rolling space, and they are preferably provided with inclined surfaces 14 rising in the direction of conveying.

The material coming from the worm 10 is first pressed against the oblique inclined surface 14 of the first damming ring 13, and the stripping of the berries begins here between the rings 12 and the wall of the cylinder 1 or its ribs 11. The material overflows through the narrow space between the ring 13 and the cylinder 1, into the annular space situated between the first and second rings 13, and is here submitted again to a stripping action. The oblique ribs 12 press it against the inclined surface 14 of the second ring, so that a certain pressure is produced in the mass of the material, and the berries will rub not only against the ribs and the outer cylinder but also against each other. This process continues in the same way between the subsequent annular spaces. It may be assumed that the pulp will be practically removed in the first half of the rolling and stripping space, and that in the remaining portion of the said space, up to the last annular field of the cylinder, the mucous integument will be mechanically detached from the kernel, together with any pulp still adhering.

The distance of the damming rings 13 from each other may decrease in the direction of conveying, as indicated in the development of a part of the surface of the cylinder 3 in Figure 4. The material will be thus progressively dammed and can be kept in the machine for a longer or shorter time, according to the number and distance apart of the damming rings 13. While this removal of pulp and mucilage from the kernels is taking place under pressure, rinsing water is continuously admitted to the annular spaces through the openings 8 and 9 and in that way the cleaning effect is materially assisted. The stripped portions of pulp and mucilage are discharged from the outer cylinder 1 through sieve-like openings, slots 15 or the like, which are provided in the lower portion of the cylinder. The mixture of pulp and mucilage is therefore jointly discharged and can be supplied to any suitable briquetting device which moulds combustible briquettes from this mixture, the mucilage constituting the binder for the briquettes to be formed.

The kernels arriving at the outlet, are rinsed once more in the last annular space pressed towards the outlet opening 5 by the ribs 12' (see Figure 3) which are also somewhat oblique relatively to the cylinder axis, and the said kernels overflow through the opening 5 upwards into the pipe 6, on entering which they are again washed by the rinsing water supplied through the funnel 7. The kernels are then free from pulp and mucilage and ready for drying. When they are dried, the parchment envelope is mechanically shelled off in the usual manner, and the coffee beans are exposed.

The construction of the machine by means of which the coffee berries are stripped, freed from mucilage and washed in a single operation, might be varied; more particularly the construction of the inner cylinder provided with the stripping ribs could be adapted to the nature of the material to be treated. It is essential that during the pulp stripping and removal of mucilage the material should be subjected to an intermittent or continuously increasing pressure, in order to ensure that not only the pulp is crushed off as in the devices hitherto used, but also the mucous integument is loosened by the friction of the berries against each other and against the walls of the rolling space.

The new process is more particularly intended for coffee berries but can be applied also to other fruits having kernels which are required to be freed from their outer portions ready for further treatment.

What I claim and desire to secure by Letters Patent of the United States is:—

1. A process for removing pulp from the kernels of coffee berries and similar fleshy fruit comprising feeding the fruit longitudinally of a casing while subjecting it to the simultaneous action of pressure applied in different directions and a washing liquid, whereby in passing through a single casing the fruit kernels are stripped of pulp, freed from mucilage and washed.

2. In an apparatus for the removal of pulp from the kernels of coffee berries and similar fleshy fruit, the combination of a fixed casing, means for feeding the fruit to be treated through the casing, means for causing water to flow through the interior of the casing, and mechanical means within the casing for stripping the pulp from the fruit kernels, freeing the kernels from mucilage, and washing the kernels.

3. In an apparatus for stripping the kernels of coffee berries and other similar fruit, the combination of a casing provided with internal ribs, a hollow cylinder rotatable within said casing and annularly spaced therefrom, and means for causing water to flow through the space between the casing and cylinder, the casing having an outlet communicating with said space for discharging the fruit kernels and independent means for discharging from said space the matter stripped from the kernels.

4. Apparatus as in claim 3 in which damming rings are provided on the rotary cylinder, whereby the width of the annular space between said cylinder and the casing is reduced at various points in the length of the casing.

5. Apparatus as in claim 3 in which the rotary cylinder is provided with damming rings and, at points between said rings, with ribs extending at an angle to the axis of the cylinder, for the purpose described.

6. Apparatus as in claim 3 in which damming rings are provided on the rotary cylinder, said rings being arranged relatively closer together adjacent the kernel discharge outlet than adjacent the feed end of the casing.

7. In an apparatus for the removal of pulp from the kernels of coffee berries and similar fleshy fruit, the combination of a casing having an inlet for fruit to be treated, an outlet for stripped kernels and separate means for discharging matter stripped from the kernels, a cylinder rotatable in said casing and annularly spaced therefrom, means for feeding fruit through the annular space between the casing and cylinder from the inlet to the kernel outlet, means for applying mechanical pressure to the fruit in its passage through said annular space, a discharge pipe connected with the kernel outlet of the casing, and separate means for delivering an additional supply of water to said discharge pipe to rinse the stripped kernels passing therethrough.

8. In an apparatus for the removal of pulp from the kernels of coffee berries and similar fleshy fruit, the combination of a casing having an inlet for fruit to be treated, an outlet for stripped kernels, and a series of perforations in its bottom for the discharge of matter stripped from the kernels, a cylinder rotatable in said casing and annularly spaced thereupon, means for supplying water to the space between the cylinder and casing, and means for feeding fruit through the space between the cylinder and casing and exerting pressure thereon to strip the pulp from the kernels.

9. In apparatus for stripping coffee berries and other similar fruits, a casing, a hollow cylinder rotatable within said casing and annularly spaced therefrom, means for feeding said fruits through the space between said cylinder and casing, a hollow spindle within said cylinder, said spindle and cylinder having openings adapted for the passage of fluid from the interior of said spindle to the annular space between said cylinder and casing, means for discharging the kernels of said fruits and separate means for discharging the matters stripped from said kernels.

STEVEN BIRNIE.